Patented July 6, 1937

2,085,784

UNITED STATES PATENT OFFICE 2,085,784

PROCESS OF PURIFYING AMINATED COMPOUNDS

Robert Roger Bottoms, Louisville, Ky., assignor to The Girdler Corporation, Louisville, Ky., a corporation of Delaware No Drawing. Application April 29, 1935, Serial No. 18,882

10 Claims. (Cl. 260—122)

The present invention relates to the purifying of aminated compounds, and more particularly to a process of purifying lower amino fatty acids.

In the production of aminated compounds and particularly in the production of amino acids, it is customary to react the corresponding halogenated acid with ammonia to cause replacement of the halogen with the amino group with resultant formation of the ammonium halide.

For example, in the production of glycine or amino-acetic acid, and alanine or amino-propionic acid, substantial quantities of ammonium chloride are formed and must be separated from the glycine or alanine, if a chlorine-free product is desired.

It has been found most difficult to remove substantially all of the chlorine, which usually is found in the form of ammonium chloride, from the alanine and/or glycine without at the same time seriously decreasing the yield of the amino-carboxylic acid.

Among the objects of the present invention are to produce aminated compounds from the corresponding halogenated compounds in substantially halogen-free condition with relative high yields without the necessity of resorting to difficult or involved processes of purification to remove the halogen or ammonium halide present.

Another object is to provide a process for separating aminated compounds and ammonium chloride, which process may be readily and quickly performed without substantial decrease in the yield of any of the aminated compound present.

Another object is to provide a process for the preparation of glycine and alanine in which the glycine or alanine may be produced with high yield and in substantially chlorine-free condition.

Other objects will be obvious and/or will appear during the course of the following specification.

In accomplishing the above objects it has been found most satisfactory to prepare a reaction mixture containing the desired aminated compound, for example, glycine or alanine, by reacting together an excess of ammonia with the corresponding halogenated compound. For example, in the production of glycine, chloracetic acid is reacted with a large excess of aqueous ammonia to produce a reaction mixture containing glycine and substantial quantities of ammonium chloride.

It has been found that the chlorine may be readily removed from the resultant reaction mixture by reacting the ammonium chloride therein with a suitable, preferably water-soluble, alkyl-amine which will displace the ammonia and form the corresponding amine-hydrochloride.

The amine-hydrochlorides so produced will have very different reactivities, solubilities, and/or other properties than the residual amino carboxylic acids, with the result that they may be readily separated from such amino carboxylic acids.

Among the preferred alkylamines are the secondary amines of low molecular weight, as for example, diethylamine. Although other amino compounds may be employed, such as ethylamine, dimethylamine, triethylamine, or dipropylamine, diethylamine has been found to be most satisfactory.

When the diethylamine or other amino compound is added, the ammonia will be liberated from the ammonium chloride with the resultant formation of the amine hydrochloride, liberating free ammonia which may be removed by distillation.

The resultant mixture of the diethylamine hydrochloride and glycine may then be readily separated because of the differential solubility of these compounds in alcohol-water mixtures. For example, upon the addition of methyl or ethyl alcohol, or other aliphatic alcohols, miscible with water, the glycine will be precipitated free of chlorides and may be filtered off and collected in pure condition.

With this method of operation it has been possible to obtain yields of glycine as high as 90% of the theoretical.

If desired, the diethylamine hydrochloride and glycine may also be separated because of their differential solubility in organic solvents by evaporating to dryness and then removing the diethylamine hydrochloride from the mixture by extraction with an organic solvent, such as chloroform, or ethyl or methyl alcohol.

In making use of the differential solubility of glycine and amine hydrochloride, other amines may be employed, such as monoethylamine, methylamine, triethylamine, propylamine, and other alkylamines which will replace ammonia in ammonium salts and which will form hydrochlorides soluble in methyl alcohol, chloroform, and other organic solvents.

If desired, instead of converting the ammonium chloride or other ammonium halide into the amine hydrochloride before evaporation to dryness, the mixture of the ammonium chloride and glycine or alanine may be evaporated to dryness. Then the dry mixture may be treated with an alcoholic or chloroform solution of the alkyl amine, such as diethylamine, whereupon the ammonium chloride will be converted into free ammonia and amine hydrochloride, which will go into the solution in the organic solvent.

If desired, the alcoholic solution of the alkyl amine may be added directly to the aqueous reaction mixture with or without evaporation, simultaneously to cause precipitation of the glycine and/or alanine and conversion of the ammonium chloride to the amine hydrochloride.

In all these processes the alkylamine may be recovered from its hydrochloride after removal from the glycine or alanine and may be reused. The organic solvent may also be reused, if desired, and it is also possible to recover the ammonia. As an example of separating the ammonium chloride from a solution containing glycine and ammonium chloride without evaporation to dryness, the following is given:

94 grams of monochloracetic acid are dissolved in about 250 cc. of water and added to two liters of concentrated aqueous ammonia containing from 25% to 30% ammonia at ordinary room temperature. The solution is allowed to stand for two or three hours until the reaction is complete. The ammonia is then distilled from the solution and recovered, and the resulting solution of glycine and ammonium chloride is then concentrated to a volume of about 300 to 400 cc.

75 grams of diethylamine are then added to the solution and the ammonia which is released is distilled off and the solution further concentrated to about 250 cc. The resulting concentrated solution containing the glycine and the amine hydrochloride is then cooled and a liter of methyl alcohol added and the mixture stirred. The free glycine which is insoluble in alcohol will be precipitated and is filtered off. The filter containing the glycine is then washed two or three times with 80% methyl alcohol and dried.

The resulting glycine produced in this manner is a chemically pure grade of glycine, free of both ammonia and chlorine. The methyl alcohol and also the diethylamine hydrochloride may be recovered and the diethylamine hydrochloride may then be treated for recovery and reuse of the diethylamine.

As another example of separating ammonium chloride from glycine, after evaporation to dryness, the following example is given:

94 grams of monochloracetic acid dissolved in about 200 cc. to 300 cc. of water, are added to about two liters of concentrated aqueous ammonia, and the mixture allowed to stand until the reaction is complete. The solution is then concentrated as before to a volume of about 300 cc. to 400 cc.

75 grams of diethylamine are then added to the concentrated glycine ammonium chloride solution and the resulting solution evaporated to dryness. The dry mixture of glycine and amine hydrochloride is then extracted with chloroform in which the diethylamine hydrochloride is soluble.

The resulting mixture is then filtered and the filter is washed first with methyl alcohol and then several times with about 80% methyl alcohol, and is then dried. In this way pure glycine free of ammonium chloride may be obtained in about 90% yield.

Having thus described my invention, what I claim as new and desire to secure by Letters Patent is:—

1. In the process of preparing lower amino fatty acids by reacting the corresponding lower halogenated fatty acid with ammonia in excess, the steps of separating the resulting ammonium halide and amino fatty acid, which comprise decomposing the ammonium halide with a suitable alkylamine into ammonia and an alkylamine hydrohalide and then separating the alkylamine hydrohalide from the amino fatty acid by treatment with a selective organic solvent for the alkylamine hydrohalide.

2. In the process of preparing glycine by reacting chloracetic acid with ammonia in excess, the steps of separating the ammonium chloride and the glycine formed, which comprise decomposing the ammonium chloride with a suitable alkylamine into ammonia and an alkylamine hydrochloride, and then separating the alkylamine hydrochloride from the glycine by treatment with a selective organic solvent for the alkylamine hydrochloride.

3. In the process of preparing alanine by reacting chlorpropionic acid with ammonia in excess, the steps of separating the ammonium chloride and the alanine formed, which comprise decomposing the ammonium chloride with a suitable alkylamine into ammonia and an alkylamine hydrochloride, and then separating the alkylamine hydrochloride from the alanine by the treatment with a selective organic solvent for the alkylamine hydrochloride.

4. The method of separating ammonium halide from amino lower fatty acids, which comprises converting the ammonium halide into free ammonia and amine hydrohalide by treatment with a suitable lower aliphatic amine, and thereafter separating the amino acid by solution of the amine hydrohalide in a non-aqueous solvent.

5. The method of separating ammonium halide from amino lower fatty acids, which comprises treating a mixture thereof with a suitable lower aliphatic amine to convert the ammonium halide into an amine hydrohalide and free ammonia, and thereafter treating the resulting mixture with a selective organic solvent for the alkylamine hydrohalide to separate the amino acid and the hydrohalide.

6. The method of separating ammonium chloride from glycine, which comprises treating an aqueous solution of glycine containing ammonium chloride with an alcoholic solution of a suitable lower aliphatic amine to precipitate free glycine and to convert ammonium chloride into alcohol-soluble ammonia and amine hydrochloride, and thereafter separating the glycine from the alcoholic solution of the hydrochloride.

7. The method of separating glycine from ammonium halide, which comprises treating a solution of glycine containing ammonium halide with a suitable lower aliphatic amine to convert the ammonium salt into an amine salt and free ammonia, and thereafter precipitating the pure glycine by adding a lower aliphatic alcohol.

8. The process of removing glycine free of chlorine from ammonium chloride solutions, which comprises adding diethylamine to decompose the ammonium chloride, removing the ammonia and precipitating the glycine with methyl alcohol.

9. The method of separating ammonium halide from amino acids, which comprises treating the solid amino acid containing the halide with an alcoholic solution of a suitable lower aliphatic amine to convert the alcohol-insoluble ammonium halide into an alcohol-soluble amine hydrohalide and free ammonia, and thereafter separating the amino acid from the alcoholic solution of the hydrohalide.

10. The method of separating ammonium halide from amino lower fatty acids, which comprises treating a solution of amino lower fatty acid containing the halide with a suitable lower alkyl amine to convert the ammonium halide into an amine hydrohalide and free ammonia, evaporating the ammonia and solvent to obtain the dry mixture of amino fatty acid and amine hydrohalide, and thereafter removing the amine hydrohalide from the amino acid by solution in chloroform.

ROBERT ROGER BOTTOMS.